(12) United States Patent
Wamprecht et al.

(10) Patent No.: US 6,680,358 B2
(45) Date of Patent: Jan. 20, 2004

(54) BONDING AGENT COMBINATION FOR WATER-PROOF COATINGS THAT ARE PRODUCED BY COIL COATING

(75) Inventors: Christian Wamprecht, Neuss (DE); Christian Füssel, Tönisvorst (DE); Karl-Ludwig Noble, Leverkusen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 5 days.

(21) Appl. No.: 10/181,535

(22) PCT Filed: Jan. 17, 2001

(86) PCT No.: PCT/EP01/00447
§ 371 (c)(1), (2), (4) Date: Jul. 18, 2002

(87) PCT Pub. No.: WO01/55239
PCT Pub. Date: Aug. 2, 2001

(65) Prior Publication Data
US 2003/0023025 A1 Jan. 30, 2003

(30) Foreign Application Priority Data
Jan. 27, 2000 (DE) .......................... 100 03 319

(51) Int. Cl.⁷ ............................................ C09D 167/02
(52) U.S. Cl. .................... 525/519; 525/440; 525/443; 528/45; 528/80; 528/81; 528/230; 428/482

(58) Field of Search ................. 525/443, 440, 525/519; 528/45, 80, 81, 230; 428/482

(56) References Cited

U.S. PATENT DOCUMENTS

| | | | |
|---|---|---|---|
| 4,101,530 A | 7/1978 | Burkhardt et al. | 528/45 |
| 4,373,081 A | 2/1983 | Nachtkamp et al. | 528/45 |
| 5,260,138 A | 11/1993 | Höhlein et al. | 428/480 |
| 5,739,204 A | 4/1998 | Piana | 524/539 |

FOREIGN PATENT DOCUMENTS

| | | |
|---|---|---|
| EP | 005 033 | 10/1979 |
| EP | 142 701 | 5/1985 |
| GB | 1518495 | 7/1978 |
| WO | 90/15090 | 12/1990 |

*Primary Examiner*—Patricia A. Short
(74) *Attorney, Agent, or Firm*—Joseph C. Gil; Thomas W. Roy

(57) ABSTRACT

The present invention relates to a new liquid, storage-stable coating composition, which is suitable for the production of coatings which have an outstanding resistance to external weathering, and binders thereof which are composed of a hardener component comprising an aminoplast resin and/or a blocked polyisocyanate and a specific polyol component of selected units, and to its use for the production of weathering-resistant coatings on any desired heat-resistant substrates.

16 Claims, No Drawings

BONDING AGENT COMBINATION FOR WATER-PROOF COATINGS THAT ARE PRODUCED BY COIL COATING

BACKGROUND OF THE INVENTION

The present invention relates to a new liquid, storage-stable coating composition, which is suitable for the production of coatings which have an outstanding resistance to external weathering, and binders thereof which are composed of a hardener component comprising an aminoplast resin and/or a blocked polyisocyanate and a specific polyol component of selected units, and to its use for the production of weathering-resistant coatings on any desired heat-resistant substrates.

One-component stoving lacquers based on polyisocyanates with blocked isocyanate groups and their use in polyurethane lacquers are known (cf. e.g. Kunststoff-Handbuch [Plastics Handbook], volume VII, Polyurethane [Polyurethanes], Carl Hanser-Verlag Munich (1966), pages 11–13, 21 et seq.).

For the use of such blocked polyisocyanates in combination with hydroxy-polyesters, there are the following main requirements:

1) Low splitting-off temperatures with the shortest possible stoving time.
2) No or only slight yellowing on stoving and brief over-stoving.
3) Adequate storage stability of the one-component lacquers.
4) No splitting off of toxicologically unacceptable cleavage products.

These requirements can be fulfilled by specific stoving binders based on hydroxy-polyesters and blocked polyisocyanates, such as are described in DE-A 2 550 156. It can be seen from DE-A 3 046 409 that the stoving binders of DE-A 2 550 156 cannot be used for the production of coatings which are exposed to shock and impact stresses in the surface region during protection of industrial goods, such as e.g. machine components, vehicle bodies or transportation containers.

Although the stoving binders of DE-A 3 046 409 give shock-and impact-resistant coatings, they cannot meet the normal demands of stability to weather. They are therefore unsuitable for coating surfaces which are exposed to extreme weathering influences, such as e.g. car bodies, facade elements etc., and for which high requirements are imposed on the mechanical properties and capacity for exposure to solvents, such as e.g. petrol.

One-component stoving binders based on hydroxy-polyesters and aminoplast resins also meet the requirements imposed after the stoving process only inadequately in respect of resistance to solvents and weathering, but lead to lacquer films which are distinguished by a favourable hardness/elasticity ratio and good adhesion. Such binder combinations are described in DE-A 2 621 657 and can be applied by the technique of automatic coil coating.

It can be seen from EP-A 494 442 that the stoving binders to date described above are unsuitable as stoving lacquers for intended uses where coatings are required of which the weathering properties must be so extremely high that in the pigmented state the lacquer films must also withstand short wavelength UV light for a relatively long time without yellowing and cracking and with high degrees of gloss of the lacquer film surfaces. Significant improvements in the UV resistance are shown by stoving lacquerings according to EP-A 494 442, where lacquer films are obtained which not only have a high level of hardness and elasticity with good adhesion to metal and good abrasion resistance but moreover withstand exposure to short wavelength UV light over a relatively long period of time without cracking and yellowing and without the addition of light stabilizers.

It is generally known in the lacquer branch that tests on lacquerings by means of intensive exposure to short wavelength UV light are not necessarily suitable for making exact predictions in respect of the resistance of lacquers to weathering in practice. Such accelerated laboratory tests with UV apparatuses sometimes do not correlate with long-term tests under realistic conditions in practice (e.g. in Florida), so that it may be that lacquers which show good weathering results in such laboratory tests give a poorer result in practice, thus also lacquers according to EP-A 494 442.

However, the use of metal sheets lacquered by means of automatic coil coating in areas where, in addition to a good resistance to solvents and chemicals, an excellent resistance to light and weather over a period of several years is required, e.g. on facades, is of increasing importance. Here also, a high level of properties is required in respect of the mechanical properties, such as e.g. hardness, elasticity and abrasion resistance.

Surprisingly, it has now been found that the coating compositions described below in more detail, based on a hardener component of the type known per se and a specific polyester component, give lacquer films which not only have a balanced hardness and elasticity ratio with good adhesion to metal and good abrasion resistance, but moreover show an exceptionally high, hitherto unknown resistance of such lacquer systems to external weathering in a test in practice lasting several years, in the form of an extremely high gloss retention, although accelerated weathering tests on these lacquers with exposure to UV light predict poor weathering properties.

SUMMARY OF THE INVENTION

The invention provides a liquid coating composition which is stable to storage at room temperature and comprises a binder mixture, organic solvents and optionally the conventional auxiliary substances and additives known from lacquer technology, where the binder is a mixture of A) 2.0 to 30 wt. %, based on the sum of components A) and B), of a crosslinking component comprising at least one aminoplast resin and/or at least one blocked polyisocyanate and B) 98 to 70 wt. %, based on the sum of components A) and B), of a polyester component comprising at least one polyester containing hydroxyl-and carboxyl groups, characterized in that component B) has an average number-average molecular weight Mn of 500 to 10,000 g/mol, a hydroxyl number of 20 to 50 mg KOH/g and an acid number of 0.5 to 30 mg KOH/g and has been prepared by polycondensation of a) 50.5 to 53 mol % of a polyol component comprising
   a1) 60 to 80 mol % neopentylglycol and/or 1,4-cyclohexanedimethanol,
   a2) 20 to 30 mol % ethylene glycol, 1,2- and 1,3-propanediol, 1,3- and 1,4-butanediol and/or 1,6-hexanediol,
   a3) 0.1 to 5 mol % trimethylolpropane, glycerol and/or pentaerythritol,
   a4) 0 to 19.9 mol % of other alcohols which differ from a1) to a3) with b) 47 to 49.5 mol % of a polycarboxylic acid component comprising
b1) 55 to 75 mol % isophthalic acid,
b2) 10 to 40 mol % terephthalic acid and/or phthalic acid or the anhydride thereof,
b3) 0.1 to 20 mol % adipic acid and
b4) 0 to 34.9 mol % of other carboxylic acids which differ from b1) to b3).

The invention also provides the use of this coating composition for the production of coatings which can be cured under the influence of heat on any desired heat-resistant substrates.

DETAILED DESCRIPTION OF THE INVENTION

The binders of the coating composition according to the invention comprise 2 to 30, preferably 3 to 25 wt. % of a crosslinking component A) and 98 to 70, preferably 97 to 75 wt. % of a polyester component B), the percentages stated adding up to 100.

Crosslinking component A) comprises at least one aminoplast resin and/or at least one blocked polyisocyanate.

Melamine-formaldehyde or urea-formaldehyde condensation products, for example, are to be regarded as aminoplast resins. Suitable melamine resins are all the conventional melamine-formaldehyde condensates which are not etherified, partially etherified or completely etherified with saturated monoalcohols having 1 to 4 C atoms, such as are described e.g. in FR-A 943 411 or by D. H. Solomon, The Chemistry of Organic Film Formers, 235–240, John Wiley & Sons, Inc., New York, 1967. However, some or all of the melamine resins can also be replaced by other crosslinking aminoplasts, such as are described e.g. in "Methoden der Organischen Chemie [Methods of Organic Chemistry]" (Houben-Weyl), vol. 14/2, part 2, 4th ed. Georg Thieme Verlag, Stuttgart, 1963, 319 et seq.

Those blocked polyisocyanates which are based on aromatic polyisocyanates are less suitable as the blocked polyisocyanates, because of the extreme resistance to weathering required of the lacquerings according to the invention. Rather, those blocked polyisocyanates which are based on light-fast, aliphatic or cycloaliphatic polyisocyanates are possible according to the invention, such as e.g. 1,6-diisocyanatohexane, 1-isocyanato-3,3,5-trimethyl-5-isocyanatomethyl-cyclohexane (iso-phorone-diisocyante), 1,3- and 1,4-cyclohexane-diisocyanate, tetramethylcyclohexane-1,3-and-1,4-diisocyanate, 4,4'-diisocyanatodicyclohexylmethane, 2,4'-diisocyanatodicyclohexylmethane etc. and mixtures thereof. However, chemical modifications prepared therefrom with preferably biuret, allophanate or urethane groups and uretdione and isocyanurate and/or iminooxadiazinedione structures can also be employed as crosslinking components after reversible blocking of the still free isocyanate groups. Such base compounds containing isocyanurate groups are described, for example, in the patent specifications EP-A 0 003 505, DE-A 1101 394, U.S. Pat. No. 3,358,010, U.S. Pat. No. 3,903,127, U.S. Pat. No. 4,324,879, U.S. Pat. No. 4,288,586, DE-A 3 100 262, DE-A 3 100 263, DE-A 3 033 860 and DE-A 3 144 672.

For the preparation of the reversibly blocked polyisocyanate component, the base isocyanates or mixtures thereof are preferably reacted with blocking agents such as e.g. ε-caprolactam, acetone oxime, butanone oxime, cyclohexanone oxime, 3,5-dimethyl pyrazole, 1,2,4-triazole diethyl malonate and diethyl acetoacetate, so that as a rule complete blocking of the free isocyanate groups is achieved.

The blocking reaction of the free isocyanate groups with ε-caprolactam or butanone oxime is carried out at temperatures between 100 to 130° C., as described e.g. in DE-A 3 004 876.

The presence of catalysts, e.g. organotin compounds or particular tertiary amines, such as e.g. triethylamine, in amounts of between 0.01 to 0.1 wt. %, based on the total weight, is advantageous here.

The blocking reaction with malonic esters or acetoacetic acid esters takes place in a manner known per se (cf. DE-A 2 342 603 or 2 550 156) with the aid of basic catalysts, such as e.g. sodium phenolate, sodium methylate or other alkali metal alcoholates. Other organic alkali metal compounds, such as e.g. sodium malonate, are also possible. The catalysts are employed in an amount of 0.1% to 2%, based on the total weight of the reaction components. The amount of dialkyl malonate employed should be at least 1 mol per isocyanate equivalent; however, it is expedient to use a 5 to 20% excess of blocking agent.

In principle, it is also possible to only partly block a polyisocyanate which corresponds to definition A) but is unblocked, so that, for example, 40 to 90% of the isocyanate groups are present in blocked form, and then to react the partly blocked polyisocyanate with a polyol of the type suitable as component B). Analogously to this, the preparation of the combinations A) and B) according to the invention can be carried out not only as described below by mixing the individual components, but also by partly blocking unblocked polyisocyanates or polyisocyanate mixtures, so that, for example, up to 30% of the isocyanate groups are still present in the free form, and by then adding the polyester polyols suitable as component B) in an amount such that after the addition reaction which proceeds spontaneously between the free isocyanate groups and some of the hydroxyl groups of the polyester polyol, a mixture of blocked polyisocyanates and excess polyester polyol B) for which the equivalent ratio of blocked polyisocyanate groups to hydroxyl groups lies within the range essential to the invention of 0.6:1 to 2:1 is present. In such a case, component A) would comprise the said reaction product between the partly blocked polyisocyanate and the polyester polyol mentioned.

The blocking reaction can be carried out without a solvent or in the presence of a solvent or a mixture of solvents which is inert towards isocyanate groups. Possible such solvents are, for example:

esters, such as e.g. ethyl acetate, butyl acetate, methoxypropyl acetate, methylglycol acetate, ethylglycol acetate and diethylene glycol monomethyl ether acetate dimethyl esters or diethyl esters of adipic, glutaric and succinic acids; ketones, such as e.g. methyl ethyl ketone, methyl isobutyl ketone and methyl amyl ketone; aromatics, such as e.g. toluene and xylene, and the conventional higher-boiling hydrocarbon mixtures in lacquer chemistry.

The abovementioned solvents can be employed individually or as mixtures. Instead of solvents, it is also possible to use plasticizers, such as e.g. commercially available phosphoric acid esters, phthalic acid esters or sulfonic acid esters.

Blocked polyisocyanates which can be employed according to the invention as component A) are described e.g. in DE-A 2 342 603, 2 436 872, 2 550 156, 2 612 783, 2 612 784 or 2 612 785.

Mixtures of blocked polyisocyanates and aminoplast resins can also be used as component A) in the coating compositions according to the invention.

Component B) of the coating compositions according to the invention comprises polyesters with an average number-average molecular weight Mn determined by means of gel permeation chromatography (polystyrene calibration) of 500 to 10,000, preferably 1,000 to 8,000, particularly preferably 2,000 to 6,000 and very particularly preferably 3,000 to 4,500, with a heterogeneity H=(Mw/Mn)−1 of <5, preferably <4 and particularly preferably <3, a hydroxyl number of 20 to 50, preferably 25 to 46 and particularly preferably 30 to 42 mg KOH/g, and an acid number of 0.5 to 30, preferably 0.5 to 20 and particularly preferably 0.5 to 10 mg KOH/g, which have been prepared by polycondensation of a) 50.5 to 53 mol % of a polyol component comprising:
   a1) 60 to 80 mol % neopentylglycol and/or 1,4-cyclohexanedimethanol,
   a2) 20 to 30 mol % ethylene glycol, 1,2- and 1,3-propanediol, 1,3- and 1,4-butanediol and/or 1,6-hexanediol,
   a3) 0.1 to 5 mol % trimethylolpropane, glycerol and/or pentaerythritol and
   a4) 0 to 19.9 mol % of other alcohols which differ from a1) to a3) with
b) 47 to 49.5 mol % of a polycarboxylic acid component comprising
   b1) 55 to 75 mol % isophthalic acid,
   b2) 10 to 40 mol % terephthalic acid and/or phthalic acid or the anhydride thereof,
   b3) 0.1 to 20 mol % adipic acid and
   b4) 0 to 34.9 mol % of other carboxylic acids which differ from b1) to b3).

The percentages of a) and b), a1) to a4) and b1) to b4) stated adding up to 100.

Esterification reactions can be greatly accelerated with the aid of catalysts. The polyesters B) are therefore preferably esterification products of:

a) 50.5 to 52.5 mol % of a polyol component comprising
   a1) 62 to 78 mol % neopentylglycol and/or 1,4-cyclohexanedimethanol,
   a2) 22 to 30 mol % ethylene glycol, 1,2- and 1,3-propanediol, 1,3- and 1,4-butanediol and/or 1,6-hexanediol,
   a3) 1 to 4.5 mol % trimethylolpropane, glycerol and/or pentaerythritol and
   a4) 0 to 15 mol % of other alcohols which differ from a1) to a3) with
b) 47.5 to 49.5 mol % of a polycarboxylic acid component comprising
   b1) 57 to 73 mol % isophthalic acid,
   b2) 12 to 38 mol % terephthalic acid and/or phthalic acid or the anhydride thereof,
   b3) 2 to 18 mol % adipic acid and
   b4) 0 to 29 mol % of other carboxylic acids which differ from b1) to b3), which have been prepared using titanium- and/or tin-containing catalysts of a molecular weight range from 166 to 300. The percentages stated of a) and b), a1) to a4) and b1) to b4) adding up to 100.

The polyesters B) are particularly preferably esterification products of:

a) 50.5 to 52 mol % of a polyol component comprising
   a1) 64 to 76 mol % neopentylglycol and/or 1,4-cyclohexanedimethanol,
   a2) 24 to 30 mol % ethylene glycol, 1,2- and 1,3-propanediol, 1,3- and 1,4-butanediol and/or 1,6-hexanediol,
   a3) 2 to 4.5 mol % trimethylolpropane, glycerol and/or pentaerythritol and
   a4) 0 to 10 mol % of other alcohols which differ from a1) to a3) with
b) 48 to 49.5 mol % of a polycarboxylic acid component comprising
   b1) 58 to 72 mol % isophthalic acid,
   b2) 14 to 36 mol % terephthalic acid and/or phthalic acid or the anhydride thereof,
   b3) 4 to 16 mol % adipic acid and
   b4) 0 to 24 mol % of other carboxylic acids which differ from b1) to b3), which have been prepared using tin-containing catalysts of a molecular weight range from 166 to 300. The percentages stated of a) and b), a1) to a4) and b1) to b4) adding up to 100

The polyesters B) are very particularly preferably esterification products of:

a) 51 to 52 mol % of a polyol component comprising
   a1) 66 to 74 mol % neopentylglycol,
   a2) 24 to 28 mol % 1,6-hexanediol,
   a3) 2.5 to 4.5 mol % trimethylolpropane and
   a4) 0 to 7.5 mol % of other alcohols which differ from a1) to a3) with
b) 48 to 49 mol % of a polycarboxylic acid component comprising
   b1) 60 to 70 mol % isophthalic acid,
   b2) 20 to 30 mol % phthalic acid or the anhydride thereof,
   b3) 5 to 15 mol % adipic acid and
   b4) 0 to 15 mol % of other carboxylic acids which differ from b1) to b3), which have been prepared using tin-containing catalysts of a molecular weight range from 200 to 250. The percentages stated of a) and b), a1) to a4) and b1) to b4) adding up to 100.

The polyesters are prepared in a manner known per se by methods such as are described in detail, for example, in "Ullmanns Encyclopädie der technischen Chemie [Ullmanns Encyclopaedia of Industrial Chemistry", Verlag Chemie Weinheim, 4th edition (1980), volume 19, pages 61 et seq. or H. Wagner and H. F. Sarx, "Lackkunstharze [Lacquer Synthetic Resins]", Carl Hanser Verlag, Munich (1971), pages 86 to 152.

The esterification is carried out in the presence of titanium and/or tin-containing catalysts of the molecular weight range from 166 to 300, preferably 200 to 250, at esterification temperatures of 80 to 260° C., preferably 120 to 240° C., and particularly preferably 160 to 220° C. The esterification reaction is carried out until the required values for the hydroxyl and acid number are reached. After the condensation reaction, the polyester polyols are dissolved in suitable solvents, such as have been described above, for example, for the blocking of the polyisocyanates.

To prepare the binder combinations present in the coating compositions according to the invention with exclusive use of blocked polyisocyanates as component A), polyisocyanate component A) and polyester component B) are mixed, and in particular such that the ratios of amounts correspond to an equivalent ratio of blocked polyisocyanate groups to hydroxyl groups of 0.6:1 to 2:1, preferably 0.8:1 to 1.5:1, and particularly preferably 0.9:1 to 1.3:1. It should be ensured that mixing of the components is carried out below the temperature at which the blocked isocyanate groups can react with the hydroxyl groups.

As already mentioned, in addition to these essential binder components A) and B), the coating compositions according to the invention can also comprise auxiliary substances and additives or further binder components. These include, for example, other organic polyhydroxy compounds which are known from polyurethane lacquer technology and do not comply with the description of B), such as, for example, the conventional polyester, polyether or, preferably, polyacrylate polyols, i.e. copolymers, which are soluble in lacquer solvents of the type also employed according to the invention, of hydroxy-functional unsaturated monomers, such as e.g. hydroxyethyl and/or hydroxypropyl (meth)acrylate, with other olefinically unsaturated monomers, such as e.g. methyl methacrylate, styrene, acrylic acid, butyl acrylate, acrylonitrile or mixtures of such monomers. However, such polyhdyroxy compounds which do not comply with the definition of B) are at best used, if at all, in amounts of up to 50 hydroxyl equivalent %, based on the total amount of compounds containing hydroxyl groups which are present in the coating compositions. In the case where such polyhydroxy compounds are co-used, the amount of crosslinking component A) must of course be increased accordingly within the limits stated above, and in particular if blocked polyisocyanates are co-used as component A) the amount thereof must be such that the equivalent ratio of blocked polyisocyanates to hydroxyl groups is at least 0.6:1. The co-use of polyols which do not comply with the definition of B) is in no way preferred.

Further auxiliary substances and additives here are the conventional solvents with a boiling point of at least 75° C. or a boiling range above 75° C. The upper limit of the boiling point or boiling range of the solvents employed depends on the particular stoving conditions. The higher the stoving temperature, the higher the boiling temperatures of the solvents to be used should also be. Possible solvents are, for example, the following: aromatic hydrocarbons, such as e.g. toluene, xylene, tetralin and cumene, and technical-grade mixtures of aromatics with narrow boiling ranges, e.g. Solvesso® 100, 150 and 200 from Esso; ketones, such as e.g. methyl isobutyl ketone, diisobutyl ketone, isophorone and cyclohexanone, and esters, such as e.g. n-hexyl acetate, ethylglycol acetate, ethyl acetate, butyl acetate, methoxypropyl acetate or mixtures of such solvents.

The solvents can be added either, as already stated, during the preparation of the blocked polyisocyanates A), during the preparation of the polyester polyols B) or also at any desired later point in time.

Further auxiliary substances and additives which are optionally present in the coating compositions according to the invention are, for example, plasticizers of the type already mentioned by way of example, dispersing agents, thickeners, pigments, fillers, flow auxiliaries, light stabilizers, UV absorbers or catalysts which accelerate the crosslinking reaction.

As is known, the curing of polyester/aminoplast binders is accelerated by addition of acid. If polyesters with very low acid numbers are used, acid catalysts can be added to the coating compositions according to the invention. Thus e.g. the curing is greatly accelerated on addition of 0.5 wt. %, based on the sum of components A) and B), of p-toluenesulfonic acid.

It is also possible to add about 1 to 5 wt. %, based on the polyester, of an anhydride of a relatively acid dicarboxylic acid, e.g. maleic anhydride, to polyesters of low acid number in order subsequently to increase the acid number and in this way also to lower the stoving temperatures without the addition of further acid catalysts, and/or to shorten the stoving times.

The coating compositions according to the invention are liquid and storage-stable mixtures at room temperature and, as described above, can be formulated to processable lacquers by further additions.

To produce coatings using lacquers based on the coating compositions according to the invention, these are applied in one or more layers to any desired heat-resistant substrates by application methods known per se, for example by spraying, dipping, flooding or with the aid of rollers or doctor blades. The lacquers based on the coating compositions according to the invention are suitable for the production of coatings on metals, plastics, wood or glass. The lacquers based on the coating compositions according to the invention are particularly suitable for the production of coatings on aluminium and steel coils, which are coated by the automatic coil lacquering process and are used as vehicle bodies, housings for machines and domestic appliances, lining sheets, drums or containers. The substrates to be coated can be provided with suitable primer coats before the coating. In the use according to the invention, the amount of coating composition according to the invention employed is in general such that dry layer thicknesses of approx. 5 to 50 µm are present. However, it is also possible to produce considerably thicker layers.

Curing of the lacquers based on the coating compositions according to the invention takes place in a temperature range of 90 to 500° C., preferably 110 to 400° C., and in a time from 45 to 0.25 minutes, preferably 35 to 0.50 minutes, depending on the use. The cured coatings have outstanding lacquer properties, and the exceptionally good resistance to external weathering, above all also under specific climatic conditions (e.g. Florida, USA), is to be emphasized in particular.

The surface protection which can be achieved according to the invention is demonstrated in the following examples. All the percentages relate to percentages by weight.

EXAMPLES

Example 1 (According to the Invention)

345 g ethylene glycol, 951 g neopentylglycol, 648 g hexane-1,6-diol, 93 g trimethylolpropane, 732 g phthalic anhydride and 0.45 g ®Fascat 4100[1] are weighed into a 51 stirred tank equipped with a stirrer, a distillation bridge with a column and with a nitrogen inlet tube and are heated to 125° C. During the heating up phase, a single tank volume of nitrogen/h is passed through. At 125° C., 2,016 g isophthalic acid and 321 g adipic acid are added, the stream of nitrogen is increased to twice the tank volume/h and the mixture is heated up to 220° C. with limitation of the overhead temperature to max. 105° C. During this procedure most of the water of reaction is split off, a bottom temperature of 220° C. being reached towards the end. The condensation reaction is carried out at 220° C. until an acid number of ≦3 mg KOH/g is reached. Approx. 4,500 g of a polycondensation product with an acid number of 2 mg KOH/g and an OH number of 35 mg KOH/g result. 1,800 g of a solvent mixture of 3 parts ®Solvesso 150[2] and 1 part DBE-Ester[3] are added to 2,700 g of this resin, while stirring. A solution with a solids content of 60 wt. %, a acid number of 1,2 mg KOH/g and a viscosity of 3,661 mPas, measured at 23° C. in a rotary viscometer from Haake (Rotovisko RV 20), results.

[1]Elf Atochem Deutschland GmbH, Düsseldorf
[2]Esso A G, Cologne
[3]Lemro GmbH, Grevenbroich

Example 2 (According to the Invention)

345 g ethylene glycol, 1,098 g neopentylglycol, 486 g hexane-1,6-diol, 93 g trimethylolpropane, 2,025 g isophthalic acid, 735 g phthalic anhydride and 321 g adipic acid are subjected to a polycondensation reaction under the conditions according to example 1 with the aid of 0.45 g ®Fascat 4100. The resulting resin solution in ®Solvesso 150/DBE-Ester (3:1) has a solids content of 60.6%, a viscosity of 5,648 mPas, an acid number of 0.8 mg KOH/g and an OH number of 20.2 mg KOH/g.

Example 3 (According to the Invention)

1,392 g neopentylglycol, 588 g hexane-1,6-diol, 85 g trimethylolpropane, 1,857 g isophthalic acid, 674 g phthalic anhydride and 294 g adipic acid are subjected to a polycondensation reaction under the conditions according to example 1 with the aid of 0.45 g ®Fascat 4100, but only to an acid number of ≦5 mg KOH/g. The resulting resin solution in ®Solvesso 100 has a solids content of 60.4%, a viscosity of 1,644 mPas, an acid number of 2.3 mg KOH/g and an OH number of 23 mg KOH/g.

Example 4 (According to the Invention)

1,671 g neopentylglycol and 729 g phthalic anhydride are heated to 150° C. in a reaction tank according to example 1, while passing through 1 tank volume of nitrogen/h, and stirred at 150° C. until an OH number of <635 mg KOH/g is reached. Thereafter, 462 g hexane-1,6-diol, 87 g trimethylolpropane, 1,926 g isophthalic acid, 306 g adipic acid and 0.45 g ®Fascat 4100 are added and a polycondensation reaction is carried out as described in example 1 to an acid number of ≦2 mg KOH/g. Approx. 4,500 g of a polycondensation product with an acid number of 1.3 mg KOH/g and an OH number of 21.5 mg KOH/g result. 1,800 g of a solvent mixture of 3 parts ®Solvesso 150 and 1 part DBE-Ester are added to 2,700 g of this resin, while stirring. A solution with a solids content of 62.4 wt. % and a viscosity of 8,175 mPas results.

Example 5 (According to the Invention)

1,456 g neopentylglycol, 615 g hexane-1,6-diol, 88 g trimethylolpropane, 1,917 g isophthalic acid, 696 g phthalic anhydride and 303 g adipic acid are subjected to a polycondensation reaction under the conditions according to example 1 with the aid of 0.45 g ®Fascat 4100. The resulting resin solution in ®Solvesso 150/DBE-Ester (3:1) has a solids content of 59.5%, a viscosity of 3,000 mPas, an acid number of 1.1 mg KOH/g and an OH number of 21 mg KOH/g.

Example 6 (According to the Invention)

A polycondensation product analogous to example 5 is prepared, but without using a catalyst. A resin solution with a solids content of 59.3%, a viscosity of 3,140 mPas, an acid number of 1.2 mg KOH/g and an OH number of 21 mg KOH/g results. The condensation time to achieve the required acid number is three times longer than in example 5.

Example 7 (Comparison)

88 g propylene glycol, 1,693 g neopentylglycol, 425 g trimethylolpropane, 1,965 g isophthalic acid and 1,002 g adipic acid are subjected to a polycondensation reaction under the conditions according to example 1 without using a catalyst, to an acid number of ≦5 mg KOH/g. Approx. 4,500 g of a polycondensation product with an acid number of 4,3 mg KOH/g and an OH number of 130 mg KOH/g result. 1,575 g of a solvent mixture of 9 parts ®Solvesso 100[4] and 1 part isobutanol are added to 2,925 g of this resin. A solution with a solids content of 65.4 wt. % and a viscosity of 2,700 mPas results.

[4]Esso A G, Cologne

Example 8 (Comparison)

351 g ethylene glycol, 614 g neopentylglycol, 964 g hexane-1,6-diol, 88 g trimethylolpropane, 2,215 g isophthalic acid and 852 g phthalic anhydride are subjected to a polycondensation reaction under the conditions according to example 1 without using a catalyst, to an acid number of ≦3 mg KOH/g. The resulting resin solution in ®Solvesso 150/DBE-Ester (3:1) has a solids content of 59.6%, a viscosity of 7,700 mPas, an acid number of 1.8 mg KOH/g and an OH number of 16 mg KOH/g.

Example 9 (Use)

This example describes the preparation of ready-to-use lacquers based on the polyester polyols according to examples 1 to 6 and comparison examples 7 and 8, application thereof and testing of the resulting lacquer films.

To evaluate the general lacquer properties, white lacquers were prepared; for this, the polyester polyols from examples 1 to 6 and comparison examples 7 and 8 were provided with various additions and white pigment. A blocked, light-fast lacquer polyisocyanate was then added, an NCO/OH ratio of approx. 1:1 being adhered to. A 75% solution in ®Solvesso 100 of a polyisocyanate prepared by trimerization of hexamethylene-diisocyanate (HDI) and containing isocyanurate groups blocked with butanone oxime, with an NCO content of the solution of 11.1%, was used as the blocked lacquer polyisocyanate.

The following contents of additives were used, based on the solid resin (total of the solid contents of polyol and polyisocyanate):

TABLE 1

| Constituents | wt. % solid for solid |
|---|---|
| Dibutyltin dilaurate[5] as the catalyst, 10% in ® Solvesso 200 | 1.0 |
| ® Cellulose acetobutyrate CAB 531-1[6], 10% in ® Solvesso 200/butyldiglycol 2:1 | 2.4 |
| ® Acronal 4 F[7] as a flow agent, 50% in ® Solvesso 200 | 2.4 |

Titanium dioxide (rutile type; ® Tronox R-KB-4[8]) was added in a ratio of 1:1, based on the solid binder content (= total of polyester polyol and blocked polyisocyanate) and all the components were homogenized together on a bead mill.
[5]Oxydo GmbH, Emmerich
[6]Krahn Chemie, Hamburg
[7]BASF AG, Ludwigshafen
[8]Kerr Mc Gee, Leverkusen The white lacquer formed was diluted to a flow viscosity in a 4 mm DIN cup (DIN 53 211) of approx. 70 seconds by addition of ®Solvesso 200, drawn in a wet film layer thickness of approx. 40–50 μm on previously primed aluminium sheets (68 mm×1,590 mm) ®Alodine 1200 (metal sheets from Henkel-Technimetal, Cologne), stoved in a circulating air stoving oven at an oven temperature of 300° C. (≘approx. 232–241° C. average object temperature) for a period of 55 to 60 seconds and cooled immediately in lukewarm water. The Buchholz hardness (DIN 53 153, *ECCA.T 12), the Gardner gloss at a 20° and 60° angle (DIN 67 530, *ECCA.T 2) the whiteness (DIN 6174, *ECCA.T 3), the resistance to solvents by means of the MEK wiping test (*NCCA standard II-15, 2 kg load), the adhesion by means of the cross-hatch test and 6 mm indentation (DIN 53 151, *ECCA.T 6), the impact test (DIN 55

669, *ECCA.T 5), the elasticity (T-bend test according to *NCCA standard II-19) and the abrasion resistance (DIN 53 754; 500 cycles, 500 g load, CS-10 stones) were determined.

*ECCA=European Coil Coating Association

*NCCA=National Coil Coating Association (USA)

The values listed in table 2 result.

TABLE 2

Lacquer properties of coatings based on examples 1 to 6 and comparison example 7 and 8

| Examples | 1 | 2 | 3 | 4 | 5 | 6 | 7 | 8 |
|---|---|---|---|---|---|---|---|---|
| Layer thickness, μm | 21 | 20 | 23 | 21 | 21 | 20 | 21 | 20 |
| Gardner gloss, 60°/20° | 93/86 | 95/88 | 99/92 | 92/85 | 98/90 | 85/79 | 79/63 | 99/75 |
| loss after 36 months in Florida, 60° | 90 | 91 | 96 | 89 | 94 | 83 | 51 | 95 |
| loss after 48 months in Florida, 60° | 84 | 86 | 89 | 83 | 88 | 77 | 36 | 69 |
| Berger white value | 91.2 | 91.5 | 93.0 | 88.3 | 92.1 | 87.3 | 89.2 | 87.0 |
| White value after over-stoving, >254° C. | 87.3 | 84.7 | 90.2 | 85.4 | 90.3 | 83.7 | 80.4 | 81.1 |
| MEK wiping test, double strokes | >100 | >100 | >100 | >100 | >100 | >100 | >100 | >100 |
| Microhardness/recovery μm | 6.8/4.8 | 6.3/4.6 | 6.9/6.2 | 6.4/4.7 | 6.8/6.0 | 6.3/6.0 | 6.0/4.5 | 6.2/4.9 |
| Adhesion after 6 mm Erichsen extension[1] | 0 | 0 | 0 | 0 | 0 | 0 | 0 | 1 |
| Impact test, inch/lb | 80 | 80 | 80 | 80 | 80 | 80 | 60 | 60 |
| T-bend test adhesion | T0 | T0 | T0 | T1 | T0 | T0 | T1 | T1 |
| T-bend test elasticity | T0 | T0 | T0 | T1 | T0 | T0 | T1 | T1 |

[1] 0 = best value (very good adhesion), 5 poorest value (poor adhesion, chipping)

The results of the lacquer tests according to table 2 demonstrate that firmly adhering, solvent-resistant coatings can be produced under coil coating conditions with lacquers based on examples 1 to 6 and 7 and 8. The starting gloss and the white value, even after over-stoving, is good to very good for all the coatings. The film hardnesses of the coatings are at a comparable level. The coating based on example 8 shows slight deficiencies in adhesion. In the impact test, the coatings based on examples 1 to 6 have advantages over the coatings based on examples 7 and 8. However, the decisive advantage of the coatings according to the invention based on examples 1 to 6 over the coatings based on examples 7 and 8 lies in the quite outstanding resistance to external weathering, investigated in the four-year external weathering test in Florida. It is clearly demonstrated in this that the coatings based on the lacquers according to the invention of examples 1 to 6 show only slight losses in gloss after weathering for four years, while the coatings based on examples 7 and 8 must suffer considerably more significant losses in gloss. It is striking here that the loss in gloss of the coating based on example 8 is still extremely low after weathering for 36 months, but is nevertheless considerably high after weathering for 48 months, compared with the coatings according to the invention based on the lacquers according to example 1 to 6. Furthermore, it can be seen that the coatings based on the polyesters according to example 1 to 5, which were prepared with a tin catalyst, show better gloss values than the coating based on the polyester from example 6. These results were not foreseeable and are completely surprising.

What is claimed is:

1. A liquid composition which is storage stable at room temperature and contains a binder wherein the binder comprises A) 2.0 to 30 wt. %, based on the weight of components A) and B), of a crosslinking component comprising at least one aminoplast resin and/or at least one blocked polyisocyanate and B) 70 to 98 wt. %, based on the weight of components A) and B), of a polyester component having a number-average molecular weight ($M_n$) of 500 to 10,000 g/mol, a hydroxyl number of 20 to 50 mg KOH/g and an acid number of 0.5 to 30 mg KOH/g and containing at least one polyester that contains hydroxyl- and carboxyl groups and comprises the polycondensation product of
a) 50.5 to 53 mol % of a polyol component comprising
   a1) 60 to 80 mol % of neopentylglycol and/or 1,4-cyclohexanedimethanol,
   a2) 20 to 30 mol % of ethylene glycol, 1,2- and 1,3-propanediol, 1,3- and 1,4-butanediol and/or 1,6-hexanediol,
   a3) 0.1 to 5 mol % of trimethylolpropane, glycerol and/or pentaerythritol,
   a4) 0 to 19.9 mol % of alcohols other than a1) to a3) with
b) 47 to 49.5 mol % of a polycarboxylic acid component comprising
   b1) 55 to 75 mol % of isophthalic acid,
   b2) 10 to 40 mol % of terephthalic acid and/or phthalic acid or the anhydride thereof,
   b3) 0.1 to 20 mol % of adipic acid and
   b4) 0 to 34.9 mol % of carboxylic acids other than b1) to b3),
wherein the percentages of components A) and B), components a) and b), components a1) to a4) and components b1) to b4) add up to 100 in each case.

2. The coating compositions of claim 1 wherein component B) has a heterogeneity H of <5.

3. The coating composition of claim 2 wherein crosslinking component A) comprises a blocked polyisocyanate.

4. The coating composition of claim 2 wherein crosslinking component A) comprises an aliphatic and/or cycloaliphatic blocked polyisocyanate.

5. The coating composition of claim 1 wherein polyester component B) has a number-average molecular weight ($M_n$) of 1,000 to 8,000, a heterogeneity H of <4, a hydroxyl number of 25 to 46 mg KOH/g and an acid number of 0.5 to 20 mg KOH/g, and contains at least one polyester that contains hydroxyl-and carboxyl groups and comprises the polycondensation product of
a) 50.5 to 52.5 mol % of a polyol component comprising
   a1) 62 to 78 mol % of neopentylglycol and/or 1,4-cyclohexanedimethanol,
   a2) 22 to 30 mol % of ethylene glycol, 1,2- and 1,3-propanediol, 1,3- and 1,4-butanediol and/or 1,6-hexanediol,
   a3) 1 to 4.5 mol % of trimethylolpropane, glycerol and/or pentaerythritol and
   a4) 0 to 15 mol % of alcohols other than a1) to a3) with
b) 47.5 to 49.5 mol % of a polycarboxylic acid component comprising b1) 57 to 73 mol % of isophthalic acid,
b2) 12 to 38 mol % of terephthalic acid and/or phthalic acid or the anhydride thereof,
b3) 2 to 18 mol % of adipic acid and
b4) 0 to 29 mol % of carboxylic acids other than b1) to b3), in the presence of a titanium- and/or tin-containing catalyst having a molecular weight of 166 to 300, wherein the percentages of components a) and b), components a1) to a4) and components b1) to b4) each add up to 100.

6. The coating composition of claim 5 wherein crosslinking component A) comprises a blocked polyisocyanate.

7. The coating composition of claim 5 wherein crosslinking component A) comprises an aliphatic and/or cycloaliphatic blocked polyisocyanate.

8. The coating composition of claim 1 wherein polyester components B) has a number-average molecular weight ($M_n$) of 2,000 to 6,000, a heterogeneity H of <3, a hydroxyl number of 30 to 42 mg KOH/g and an acid number of 0.5 to 10 mg KOH/g, and contains at least one polyester that contains hydroxyl- and carboxyl groups and comprises the polycondensation product of
  a) 50.5 to 52 mol % of a polyol component comprising
    a1) 64 to 76 mol % of neopentylglycol and/or 1,4-cyclohexanedimethanol,
    a2) 24 to 30 mol % of ethylene glycol, 1,2- and 1,3-propanediol, 1,3- and 1,4-butanediol and/or 1,6-hexanediol,
    a3) 2 to 4.5 mol % of trimethylolpropane, glycerol and/or pentaerythritol and
    a4) 0 to 10 mol % of alcohols other than a1) to a3) with
  b) 48 to 49.5 mol % of a polycarboxylic acid component comprising
    b1) 58 to 72 mol % of isophthalic acid,
    b2) 14 to 36 mol % of terephthalic acid and/or phthalic acid or the anhydride thereof,
    b3) 4 to 16 mol % of adipic acid and
    b4) 0 to 24 mol % of carboxylic acids other than b1) to b3), in the presence of a tin-containing catalyst having a molecular weight of 166 to 300, wherein the percentages of components a) and b), components a1) to a4) and components b1) to b4) each add up to 100.

9. The coating composition of claim 8 wherein crosslinking component A) comprises a blocked polyisocyanate.

10. The coating composition of claim 8 wherein crosslinking component A) comprises an aliphatic and/or cycloaliphatic blocked polyisocyanate.

11. The coating composition of claim 1 wherein polyester component B) has a number-average molecular weight ($M_n$) of 3,000 to 4,500, a heterogeneity H of <3, a hydroxyl number of 30 to 42 mg KOH/g and an acid number of 0.5 to 10 mg KOH/g, and contains at least one polyester that contains hydroxyl- and carboxyl groups and comprises the polycondensation product of
  a) 51 to 52 mol % of a polyol component comprising
    a1) 66 to 74 mol % of neopentylglycol,
    a2) 24 to 28 mol % of 1,6-hexanediol,
    a3) 2.5 to 4.5 mol % of trimethylolpropane and
    a4) 0 to 7.5 mol % of alcohols other than a1) to a3) with
  b) 48 to 49 mol % of a polycarboxylic acid component comprising
    b1) 60 to 70 mol % of isophthalic acid,
    b2) 20 to 30 mol % of phthalic acid or the anhydride thereof,
    b3) 5 to 15 mol % of adipic acid and
    b4) 0 to 15 mol % of carboxylic acids other than b1) to b3), in the presence of a tin-containing catalyst having a molecular weight of 200 to 250, wherein the percentages of components a) and b), components a1) to a4) and components b1) to b4) each add up to 100.

12. The coating composition of claim 11 wherein crosslinking component A) comprises a blocked polyisocyanate.

13. The coating composition of claim 11 wherein crosslinking component A) comprises an aliphatic and/or cycloaliphatic blocked polyisocyanate.

14. The coating composition of claim 1 wherein crosslinking component A) comprises blocked polyisocyanate.

15. The coating composition of claim 1 wherein crosslinking component A) comprises an aliphatic and/or cycloaliphatic blocked polyisocyanate.

16. A heat-resistant substrate coated with the coating composition of claim 1.

* * * * *